United States Patent
Monson et al.

(10) Patent No.: US 9,256,396 B2
(45) Date of Patent: Feb. 9, 2016

(54) SPEECH RECOGNITION FOR CONTEXT SWITCHING

(75) Inventors: Matthew J. Monson, Kirkland, WA (US); William P. Giese, Snohomish, WA (US); Daniel J. Greenawalt, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 672 days.

(21) Appl. No.: 13/270,018

(22) Filed: Oct. 10, 2011

(65) Prior Publication Data

US 2013/0090930 A1    Apr. 11, 2013

(51) Int. Cl.
*G10L 21/00* (2013.01)
*G06F 3/16* (2006.01)
*A63F 13/30* (2014.01)
*A63F 13/40* (2014.01)
*G10L 15/00* (2013.01)
*G06F 9/44* (2006.01)
*G06F 3/00* (2006.01)
(Continued)

(52) U.S. Cl.
CPC ............. *G06F 3/167* (2013.01); *A63F 13/10* (2013.01); *A63F 13/12* (2013.01); *A63F 2300/6045* (2013.01); *A63F 2300/6072* (2013.01); *G10L 2015/228* (2013.01)

(58) Field of Classification Search
USPC ............. 704/275, 251, 9, 247, 201, 254, 257; 717/113; 463/31, 1; 715/719, 728; 709/229; 707/741, 706; 348/730; 725/151; 379/93.05, 88.17
See application file for complete search history.

(56) References Cited

U.S. PATENT DOCUMENTS

| 4,984,177 A | * | 1/1991 | Rondel | .................. G10L 15/26 704/277 |
| 6,282,269 B1 | * | 8/2001 | Bowater et al. | ......... H04L 29/06 370/352 |

(Continued)

FOREIGN PATENT DOCUMENTS

| CN | 1231742 | 10/1999 |
| CN | 1864204 | 11/2006 |

OTHER PUBLICATIONS

Rogoff, Rosalind., "Voice Activated GUI—The Next User Interface", Retrieved at <<http://ieeexplore.ieee.org/stamp/stamp.jsp?tp=&arnumber=971556>>, IEEE International Professional Communication Conference Proceedings (IPCC), Oct. 24-27, 2001, pp. 117-120.

(Continued)

*Primary Examiner* — Pierre-Louis Desir
*Assistant Examiner* — Neeraj Sharma
(74) *Attorney, Agent, or Firm* — Bryan Webster; Kate Drakos; Micky Minhas

(57) ABSTRACT

Various embodiments provide techniques for implementing speech recognition for context switching In at least some embodiments, the techniques can enable a user to switch between different contexts and/or user interfaces of an application via speech commands. In at least some embodiments, a context menu is provided that lists available contexts for an application that may be navigated to via speech commands. In implementations, the contexts presented in the context menu include a subset of a larger set of contexts that are filtered based on a variety of context filtering criteria. A user can speak one of the contexts presented in the context menu to cause a navigation to a user interface associated with one of the contexts.

20 Claims, 7 Drawing Sheets

(51) Int. Cl.
| | |
|---|---|
| G06F 7/00 | (2006.01) |
| G06F 15/16 | (2006.01) |
| H04N 7/16 | (2011.01) |
| H04N 5/63 | (2006.01) |
| H04M 11/00 | (2006.01) |
| H04M 1/64 | (2006.01) |
| A63F 13/00 | (2014.01) |
| G10L 15/22 | (2006.01) |

(56) References Cited

U.S. PATENT DOCUMENTS

| | | | |
|---|---|---|---|
| 6,456,977 B1 * | 9/2002 | Wang | A63F 13/06 345/168 |
| 6,538,666 B1 * | 3/2003 | Ozawa | G10L 15/22 704/275 |
| 6,679,774 B2 * | 1/2004 | Fujioka | A63F 13/10 463/1 |
| 6,785,653 B1 | 8/2004 | White et al. | |
| 6,862,347 B1 * | 3/2005 | Umstetter | H04M 1/274516 379/356.01 |
| 6,937,984 B1 * | 8/2005 | Morgan | G10L 15/22 704/270 |
| 7,085,710 B1 * | 8/2006 | Beckert et al. | 704/201 |
| 7,162,426 B1 * | 1/2007 | Schultz | G10L 15/26 704/270 |
| 7,289,166 B2 * | 10/2007 | Kimura | 348/730 |
| 7,369,997 B2 * | 5/2008 | Chambers | G10L 15/26 704/275 |
| 7,720,683 B1 | 5/2010 | Vermeulen et al. | 704/254 |
| 8,140,335 B2 * | 3/2012 | Kennewick et al. | 704/257 |
| 8,196,174 B2 * | 6/2012 | Piepenbrink | H04N 5/44513 725/151 |
| 8,224,653 B2 * | 7/2012 | De Mers | G10L 15/01 704/275 |
| 8,315,868 B2 * | 11/2012 | Sumiyoshi | G10L 15/26 704/246 |
| 8,676,581 B2 * | 3/2014 | Flaks | G10L 17/00 348/143 |
| 8,700,594 B2 * | 4/2014 | Apacible | G06F 3/0482 704/275 |
| 8,751,672 B2 * | 6/2014 | Zafar et al. | 709/229 |
| 8,825,468 B2 * | 9/2014 | Jacobsen | G06F 17/289 351/158 |
| 2002/0023265 A1 | 2/2002 | Metcalf | |
| 2002/0169617 A1 | 11/2002 | Luisi | |
| 2003/0171147 A1 | 9/2003 | Sinclair et al. | |
| 2003/0182394 A1 | 9/2003 | Ryngler et al. | |
| 2005/0033582 A1 | 2/2005 | Gadd et al. | |
| 2006/0041926 A1 | 2/2006 | Istvan et al. | |
| 2006/0069561 A1 * | 3/2006 | Beattie et al. | 704/251 |
| 2006/0190270 A1 | 8/2006 | Luisi | |
| 2007/0061142 A1 * | 3/2007 | Hernandez-Abrego et al. | 704/247 |
| 2007/0288890 A1 | 12/2007 | Wells | |
| 2008/0208590 A1 | 8/2008 | Cross et al. | |
| 2009/0013275 A1 | 1/2009 | May et al. | |
| 2009/0150782 A1 * | 6/2009 | Baek et al. | 715/719 |
| 2009/0158151 A1 | 6/2009 | Cheng et al. | |
| 2009/0262107 A1 | 10/2009 | Castelli | |
| 2010/0169098 A1 | 7/2010 | Patch | |
| 2010/0312547 A1 * | 12/2010 | Van Os et al. | 704/9 |
| 2011/0105190 A1 | 5/2011 | Cha et al. | |
| 2012/0309515 A1 * | 12/2012 | Chung et al. | 463/31 |
| 2013/0218896 A1 | 8/2013 | Palay | 707/741 |

OTHER PUBLICATIONS

"International Search Report", Mail Date: Feb. 28, 2013, Application No. PCT/US2012/059410, Filed date:Oct. 10, 2012, pp. 11.
"Foreign Office Action", CN Application No. 201210380861.8, Dec. 3, 2014, 13 pages.
"Supplementary European Search Report", EP Application No. 12839330.3, Feb. 18, 2015, 3 pages.
"Foreign Office Action", EP Application No. 12839330.3, Mar. 5, 2015, 5 pages.
"Foreign Office Action", EP Application No. 12839330.3, Oct. 15, 2015, 6 pages.
"Foreign Office Action", CN Application No. 201210380861.8, Aug. 13, 2015, 7 pages.

* cited by examiner

SPEECH RECOGNITION FOR CONTEXT SWITCHING

BACKGROUND

Many computer applications provide a variety of different contexts and graphical user interfaces by which a user can interact with the applications. For example, a video game typically includes different user interfaces that enable a user to access various functionalities provided by the video game. Some user interfaces may enable a user to customize certain portions of the game, such as game arenas for game play, vehicles available for game play, and so on. Other user interfaces may enable a user to participate in various types of game play, such as single player game play, multiplayer game play, and so on. While these different user interfaces can provide a more interesting and diverse game experience, current ways of navigating between the various user interfaces can be cumbersome.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments provide techniques for implementing speech recognition for context switching In at least some embodiments, the techniques can enable a user to switch between different contexts and/or user interfaces of an application via speech commands. For example, a game application can include a variety of different user interfaces that provide different interaction contexts and functionalities. Some user interfaces can provide game play functionalities, while other user interfaces can provide game customization functionalities. Techniques discussed herein can enable a user to navigate among the various user interfaces by issuing speech commands.

In at least some embodiments, a context menu is provided that lists available contexts for an application that may be navigated to via speech commands. For example, a user can speak a trigger word while a user interface for a particular context of an application is being displayed. Recognition of the trigger word can cause a context menu to be displayed as part of the user interface. The context menu can include other contexts that may be navigated to via speech commands. In implementations, the other contexts presented in the context menu include a subset of a larger set of contexts that are filtered based on a variety of context filtering criteria. A user can speak one of the contexts presented in the context menu to cause a navigation to a user interface associated with a different context.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments provide techniques for implementing speech recognition for context switching In at least some embodiments, the techniques can enable a user to switch between different contexts and/or user interfaces of an application via speech commands. For example, a game application can include a variety of different user interfaces that provide different interaction contexts and functionalities. Some user interfaces can provide game play functionalities, while other user interfaces can provide game customization functionalities. Techniques discussed herein can enable a user to navigate among the various user interfaces by issuing speech commands.

In at least some embodiments, a context menu is provided that lists available contexts for an application that may be navigated to via speech commands. For example, a user can speak a trigger word while a user interface for a particular context of an application is being displayed. Recognition of the trigger word can cause a context menu to be displayed as part of the user interface. The context menu can include other contexts that may be navigated to via speech commands. In implementations, the other contexts presented in the context menu include a subset of a larger set of contexts that are filtered based on a variety of context filtering criteria. A user can speak one of the contexts presented in the context menu to cause a navigation to a user interface associated with a different context.

In the discussion that follows, a section entitled "Operating Environment" is provided and describes an environment in which one or more embodiments can be employed. Following this, a section entitled "Example Context Switching Scenarios" describes example context switching scenarios in accordance with one or more embodiments. Next, a section entitled "Example Methods" describes example methods in accordance with one or more embodiments. Last, a section entitled "Example System and Device" describes an example system and an example device that can be utilized to implement one or more embodiments.

Operating Environment

Figure 1:
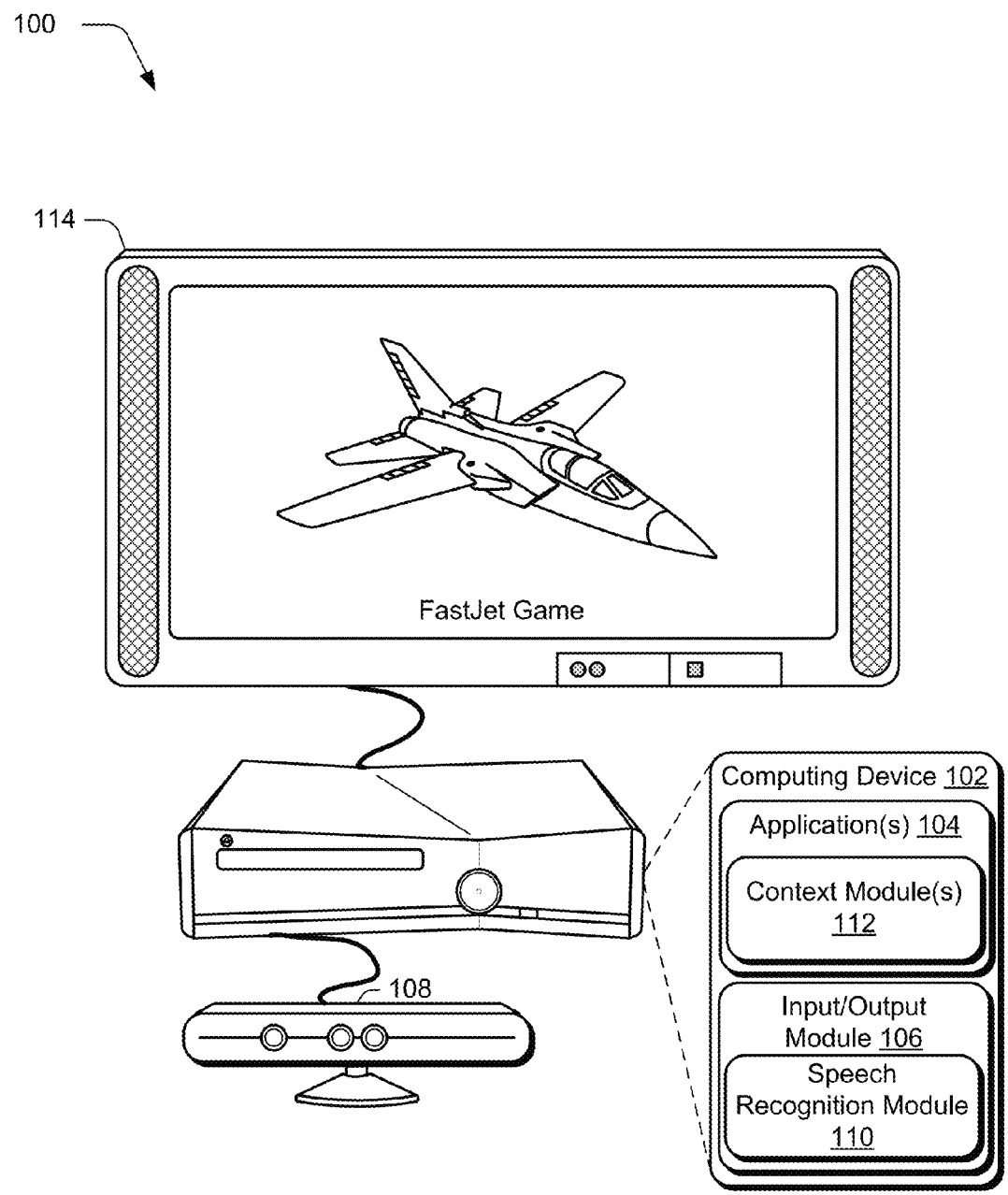
FIG. 1 is an illustration of an example operating environment that is operable to employ techniques discussed herein in accordance with one or more embodiments.

FIG. 1 illustrates an operating environment in accordance with one or more embodiments, generally at 100. Operating environment 100 includes a computing device 102 that can be configured in a variety of ways. For example, computing device 102 can be embodied as any suitable computing device such as, by way of example and not limitation, a game console, a desktop computer, a portable computer, a handheld computer such as a personal digital assistant (PDA), cell phone, and the like. One example configuration of the computing device 102 is shown and described below in FIG. 7.

Included as part of the computing device 102 are one or more applications 104, which are representative of functionalities that enable a wide variety of tasks to be performed via the computing device 102. For example, the applications 104 can be executed by the computing device 102 to provide functionalities such as video games, word processing, email, spreadsheet, media content consumption, and so on.

Further included as part of the computing device 102 is an input/output module 106 that represents functionality for sending and receiving information. For example, the input/output module 106 can be configured to receive input generated by an input device, such as a keyboard, a mouse, a touchpad, a game controller, an optical scanner, and so on. The input/output module 106 can also be configured to receive and/or interpret input received via a touchless mechanism, such as via speech recognition, gesture-based input, object scanning, and so on. Further to such embodiments, the computing device 102 includes a natural user interface (NUI) device 108 that is configured to receive a variety of touchless input, such as via visual recognition of human gestures, object scanning, speech input, color input, and so on.

Included as part of the input/output module 106 is a speech recognition module 110 that is representative of functionality to recognize speech input (e.g., from the NUI device 108) and convert the speech input into a form that can be used by other entities to perform tasks.

Further to techniques discussed herein, the applications 104 include one or more context modules 112, which are representative of functionality to enable the applications to switch between various contexts and/or user interfaces associated with the applications. In at least some embodiments, the context modules 112 are configured to receive input from the input/output module 106 and/or the speech recognition module 110 to implement techniques discussed herein.

Operating environment 100 further includes a display device 114 that is coupled to the computing device 102. In at least some embodiments, the display device 114 is configured to receive and display output from the computing device 102, such as user interfaces generated by the applications 104 and provided to the display device 114 by the input/output module 106. In implementations, the input/output module 106 can receive input (e.g., speech input) from the NUI device 108 and can utilize the input to enable a user to interact with the context modules 112 to navigate between various contexts and/or user interfaces provided by the applications 104. Further implementations of the operating environment 100 are discussed below.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Example Context Switching Scenarios

This section discusses example context switching scenarios that can be enabled by techniques discussed herein. In at least some embodiments, the example context switching scenarios can be implemented via aspects of the operating environment 100 discussed above and/or the example system 600, discussed below. Accordingly, certain aspects of the example context switching scenarios will be discussed with reference to features of the operating environment 100 and/or the example system 600. This is for purposes of example only, and aspects of the example context switching scenarios can be implemented in a variety of different operating environments and systems without departing from the spirit and scope of the claimed embodiments.

Figure 2:
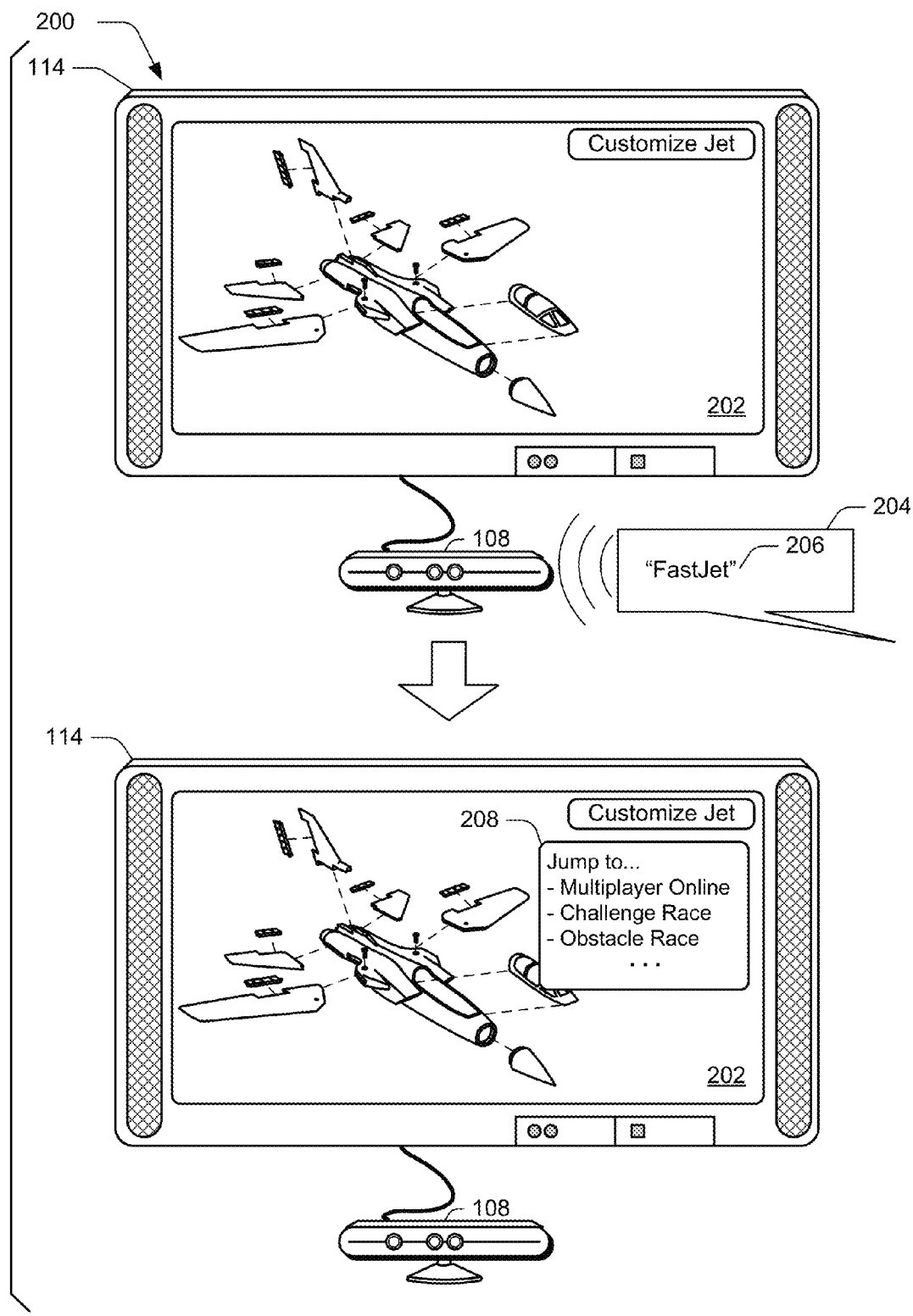
FIG. 2 is an illustration of an example context switching scenario in accordance with one or more embodiments.

FIG. 2 illustrates an example context switching scenario, generally at 200. In the upper portion of the context switching scenario 200, the display device 114 displays a customization interface 202 that is associated with a game application. In implementations, the customization interface 202 enables a user to customize various aspects of a game application, such as by switching out parts of a game vehicle, changing colors of the vehicle, and so on. Thus, the customization interface 202 is associated with a specific set of functionalities that enable various tasks associated with the game application to be performed.

Further illustrated in the upper portion of the context switching scenario is a speech input 204 to the NUI device 108. The speech input 204 represents words and/or other vocalizations that can be spoken by a user and sensed by one or more audio sensing instrumentalities of the NUI device 108. Included as part of the speech input 204 is a trigger word 206, which represents a word that can be spoken to activate speech recognition functionalities discussed herein.

Continuing to the lower portion of the context switching scenario 200, recognition of the speech input 204 (e.g., the trigger word 206) causes a context menu 208 to be presented in the customization interface 202. The context menu 208 includes context options that can be selected to navigate to other contexts associated with the game application. For example, the context options can be spoken to select a particular context option and to cause a navigation to a graphical user interface associated with the particular context option. The context options presented in the context menu 208 can include filtered context options that are filtered based on one or more filtering criteria. Example ways of filtering context options are discussed below.

Figure 3:
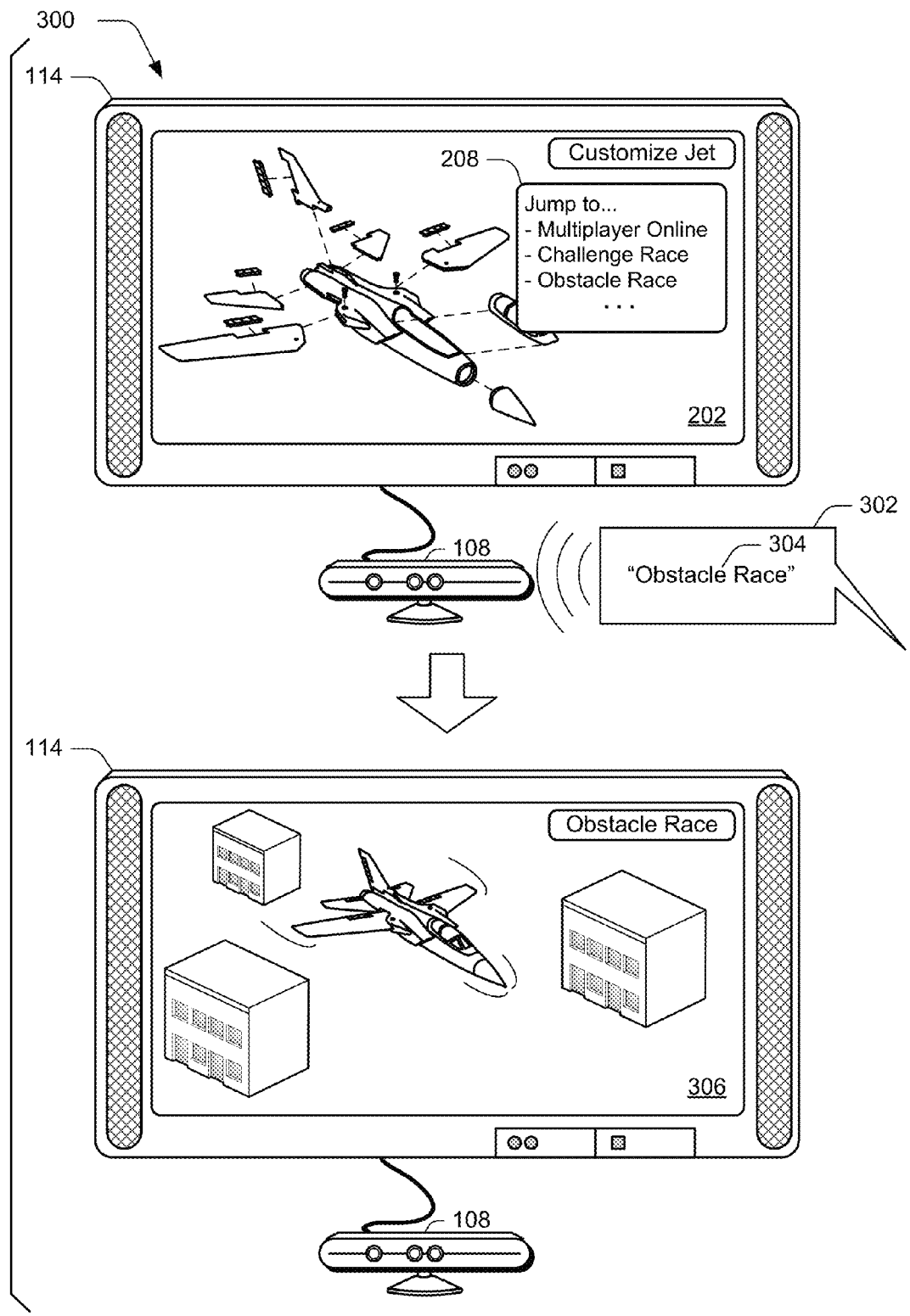
FIG. 3 is an illustration of an example context switching scenario in accordance with one or more embodiments.

FIG. 3 illustrates an example context switching scenario, generally at 300. In implementations, the context switching scenario 300 represents a continuation of the context switching scenario 200, discussed above. In the upper portion of the context switching scenario 300, the customization interface 202 is displayed along with the context menu 208. A speech input 302, which includes a context word 304, is received at the NUI device 108. In this example, the context word 304 represents a selection of one of the context options from the context menu 208.

Continuing to the lower portion of the context switching scenario 300, recognition of the speech input 302 causes a race interface 306 to be displayed on the display device 114. The race interface 306 enables a user to participate in one or more races associated with the game application. Thus, the race interface 306 can be associated with a specific set of functionalities that enable game play related actions to be performed. In implementations, the functionalities represented by the race interface 306 are different than those represented by the customization interface 202, discussed above. Thus, techniques discussed herein can enable switching between different sets of functionalities via speech input.

While the context switching scenarios are discussed above with reference to a context menu being presented, at least some embodiments can enable context switching without presentation of a context menu. For example, a user can speak a trigger word followed by a context word, which can cause a switch from one context to another independent of a presentation of a context menu. Thus, a context word can represent a word that can be spoken to invoke a particular context, user interface, and/or set of functionalities.

Having described example context switching scenarios, consider now a discussion of example methods in accordance with one or more embodiments.

Example Methods

Discussed below are a number of methods that may be implemented to perform techniques discussed herein. Aspects of the methods may be implemented in hardware, firmware, or software, or a combination thereof The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100 and below with reference to the system 600.

Figure 4:
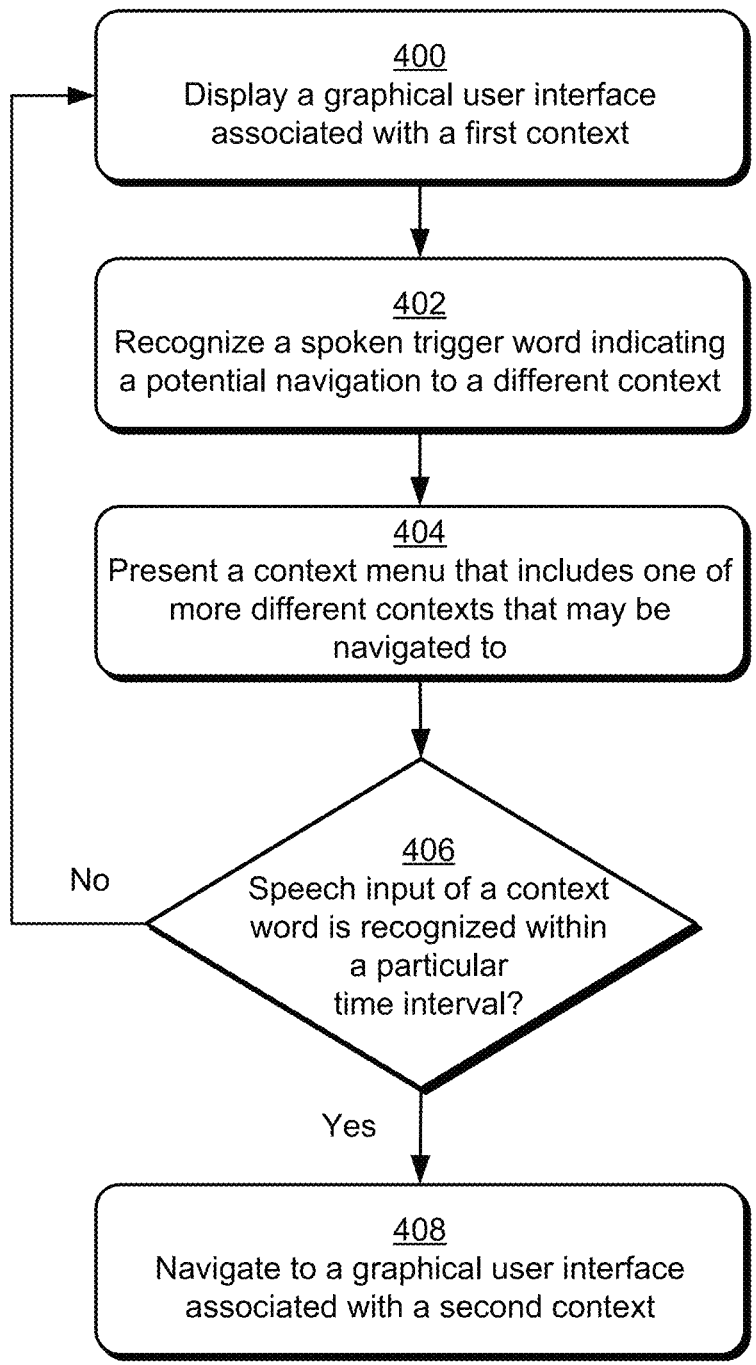
FIG. 4 is a flow diagram that describes steps in a method in accordance with one or more embodiments.

FIG. 4 is a flow diagram that describes steps a method in accordance with one or more embodiments. Step 400 displays a graphical user interface associated with a first context. For example, a game graphical user interface associated with a particular set of functionalities can be displayed. Step 402 recognizes a spoken trigger word indicating a potential navigation to a different context. A wide variety of different trigger words may be implemented to indicate the potential navigation.

Step 404 presents a context menu that includes one of more different contexts that may be navigated to. The one or more different contexts can be determined by filtering a set of contexts based on a variety of different filtering criteria. Examples of such filtering criteria are discussed below. In implementations, the context menu can be displayed as part of the graphical user interface associated with the first context.

Step 406 determines whether speech input of a context word is recognized within a particular time interval after the recognition of the trigger word. For example, a timer can begin elapsing after a spoken trigger word is detected and/or a context menu is presented. If speech input of a context word is not recognized within the particular time interval ("No"), the process returns to step 400. For example, the context menu can be removed from a display and the graphical user interface associated with the first context can be brought into focus.

If speech input of a context word is received within the particular time interval ("Yes"), step 408 navigates to a graphical user interface associated with a second context. The graphical user interface associated with the second context can be associated with a different set of functionalities than the user interface associated with the first context. In implementations, the graphical user interface associated with the second context can be navigated to and displayed in response to the speech commands (e.g., the trigger word and/or the context word) and independent of additional input from a user.

While implementations are discussed herein with respect to a combination of a trigger word and a context word, this is not intended to be limiting. For example, some implementations can employ speech recognition of a single word and/or phrase to navigate from a user interface associated with a first context to a user interface associated with a second context.

Figure 5:
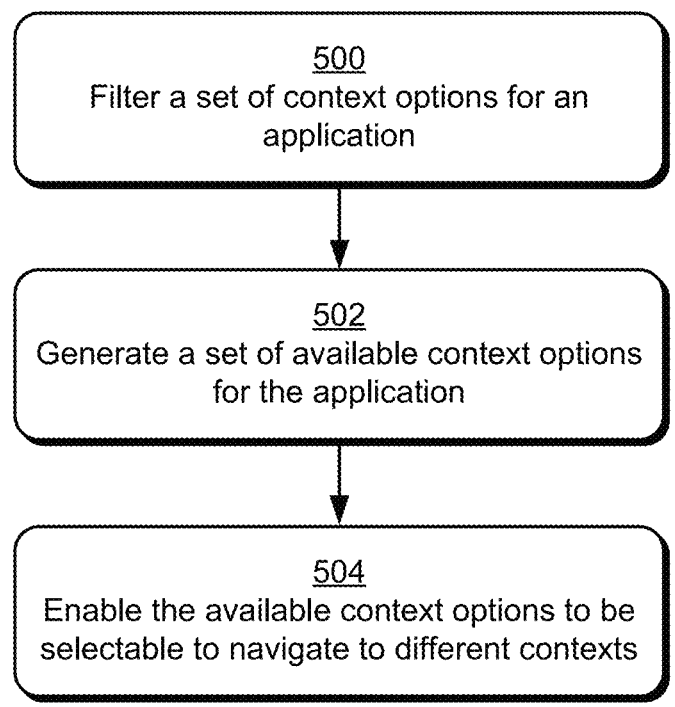
FIG. 5 is a flow diagram that describes steps in a method in accordance with one or more embodiments.

FIG. 5 is a flow diagram that describes steps a method in accordance with one or more embodiments. In implementations, the method can represent a more detailed implementation of step 404, discussed above. In at least some embodiments, the method can be implemented at least in part by one or more of the context modules 112.

Step 500 filters a set of context options for an application. For example, the set of context options can be filtered based on one or more context-specific criteria, such as attributes of the application, a device on which the application is executing, or a user of the device. In implementations, different sets of context options can be available to different versions of an application. For example, a premium version of an application can have more context options than a standard version of an application. For instance, the premium version can have access to more types of game play, more customization options, more multiplayer options, and so forth, than a standard version of the application.

Further, a status of an application can also be used to filter context options. For example, if a game application has no saved games, context options associated with saved games (e.g., viewing replays of previous games) may not be available.

Attributes of a device can also affect the context options that are available. For example, if a device is not connected to a network (e.g., the Internet) or the device's network connection is beneath a particular threshold bandwidth, certain network-related context options may not be available. Such network-related context options can include multiplayer network game play, content (e.g., vehicles, game characters, arenas, and so forth) that is available from a network resource, messaging services that utilize a network resource, and so on.

Further, particular capabilities of a device can also affect the context options that are available. For example, certain game play options that require threshold data and/or graphics processing capabilities may not be available on a device that does not meet the threshold processing capabilities.

Attributes of a user can also affect the context options that are available. For example, an application can be associated with different account membership levels that a user can subscribe to in order to access different resources and/or functionalities. A premium membership level can entitle a user to expanded accesses when compared to a standard membership level, such as extended multiplayer game time, more arena options, more vehicle options, more gameplay character options, and so on.

Attributes of a user can also consider safety controls associated with a user account. For example, a younger user may be prevented from accessing certain game content and/or functionalities that may be available to an older user. Thus, context options can be filtered based on an age of a user and/or permissions associated with the user. A variety of other considerations may also be taken into account when filtering context options.

Step 502 generates a set of available context options for the application. For example, the available context options can correspond to a subset of context options that are not filtered out of the set of context options discussed above. Step 504 enables the available context options to be selectable via a speech command to navigate to different contexts. For example, one or more of the available context options can be displayed as part of a context menu, discussed above. Additionally or alternatively, one or more of the available context options can be selectable via speech input independent of being displayed.

Having described methods in accordance with one more embodiments, consider now an example system and an example device that can be utilized to implement one or more embodiments.

Example System And Device

Figure 6:
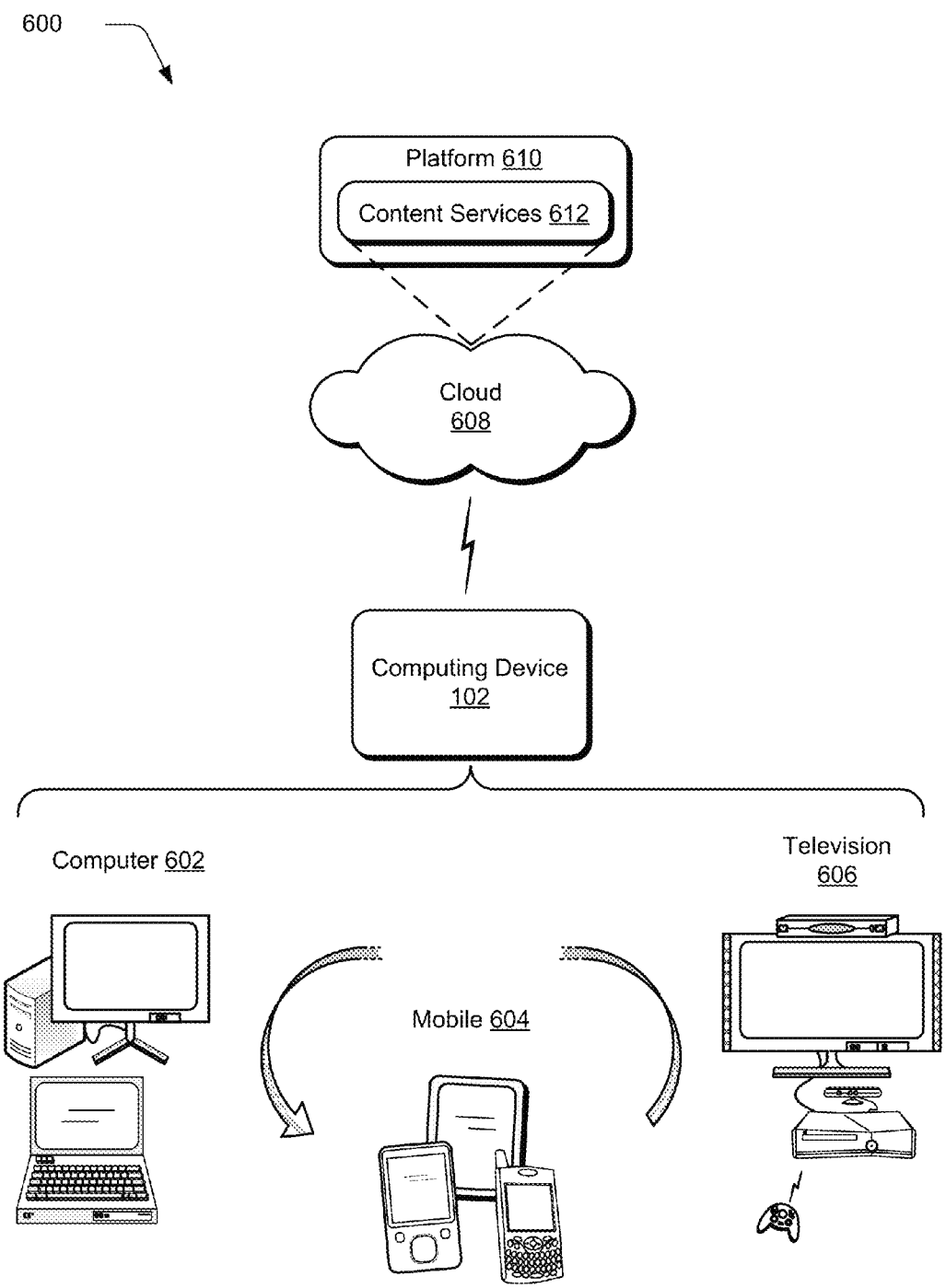
FIG. 6 illustrates an example system that includes the computing device as described with reference to FIGS. 1 and 7 in accordance with one or more embodiments.

FIG. 6 illustrates an example system 600 showing the computing device 102 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 602, computer 604, and television 606 uses. Each of these configurations has a generally corresponding screen size and thus the computing device 102 may be configured as one of these device classes in this example system 600. For instance, the computing device 102 may assume the mobile 602 class of device which includes mobile telephones, music players, game devices, and so on.

The computing device 102 may also assume a computer 604 class of device that includes personal computers, laptop computers, netbooks, and so on. The television 606 configuration includes configurations of device that involve display in a casual environment, e.g., televisions, set-top boxes, game consoles, and so on. Thus, techniques described herein may be supported by these various configurations of the computing device 102 and are not limited to the specific examples described in the following sections.

Cloud 608 is illustrated as including a platform 610 for web services 612. The platform 610 abstracts underlying functionality of hardware (e.g., servers) and software resources of the cloud 608 and thus may act as a "cloud operating system." For example, the platform 610 may abstract resources to connect the computing device 102 with other computing devices. The platform 610 may also serve to abstract scaling of resources to provide a corresponding level of scale to encountered demand for the web services 612 that are implemented via the platform 610. A variety of other examples are also contemplated, such as load balancing of servers in a server farm, protection against malicious parties (e.g., spam, viruses, and other malware), and so on.

Thus, the cloud 608 is included as a part of the strategy that pertains to software and hardware resources that are made available to the computing device 102 via the Internet or other networks. For example, techniques for speech recognition for context switching discussed herein may be implemented in part on the computing device 102 as well as via the platform 610 that supports web services 612.

In implementations, input to the computing device 102 may be detected using touchscreen functionality in the mobile configuration 602, track pad functionality of the computer 604 configuration, detected by a camera as part of support of a natural user interface (NUI) that does not involve contact with a specific input device, and so on. Further, performance of the operations to implement techniques discussed herein may be distributed throughout the system 600, such as by the computing device 102 and/or the web services 612 supported by the platform 610 of the cloud 608.

Figure 7:
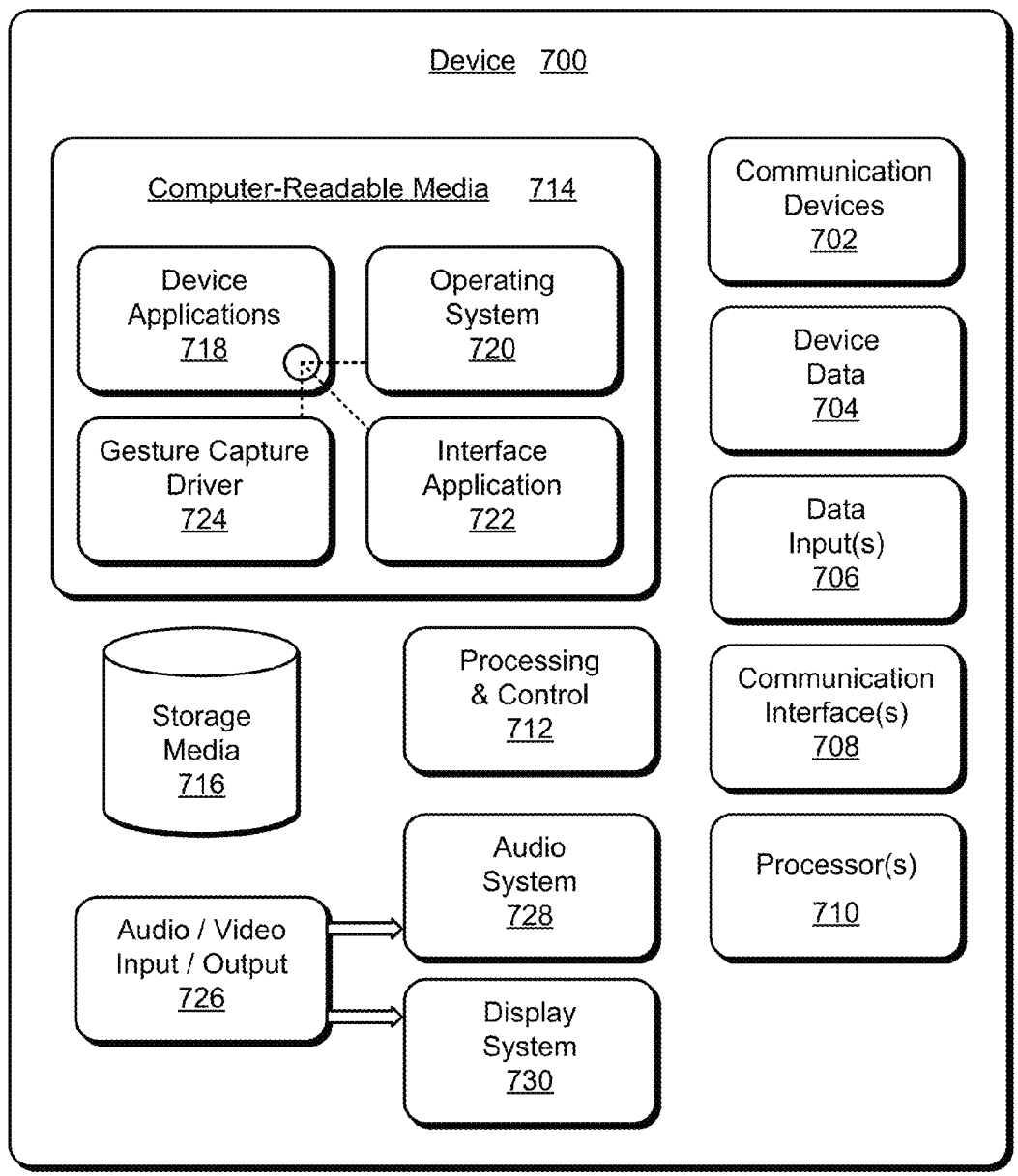
FIG. 7 illustrates an example computing device that can be utilized to implement various embodiments described herein.

FIG. 7 illustrates various components of an example device 700 that can be implemented as any type of portable and/or computer device as described with reference to FIGS. 1 and 6 to implement embodiments of the techniques for speech recognition for context switching described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable or readable instructions to control the operation of device 700 and to implement the speech recognition for context switching embodiments described above. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 718 also include system components or modules to implement embodiments of the techniques for speech recognition for context switching described herein.

In this example, the device applications 718 include an interface application 722 and a gesture-capture driver 724 that are shown as software modules and/or computer applications. The gesture-capture driver 724 is representative of software that is used to provide an interface with a device configured to capture a gesture, such as a touchscreen, track pad, camera, and so on. Alternatively or in addition, the interface application 722 and the gesture-capture driver 724 can be implemented as hardware, software, firmware, or any combination thereof.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

CONCLUSION

Various embodiments provide techniques for speech recognition for context switching Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
presenting, in response to a recognition of a spoken trigger word, a context menu in a user interface associated with an application context for a game application;
filtering a set of application contexts for the game application based on attributes of a device on which the game application is executable to identify at least one other application context, the attributes representing a set of context-specific criteria used to determine the at least one other application context and the attributes including a threshold processing capability of the device and a bandwidth of a network connection of the device, the context-specific criteria including one or more attributes of the game application or one or more attributes of a user of the device;
presenting the at least one other application context as part of the context menu such that the at least one other application context is navigable to via a speech input command;
recognizing, within a specific time interval after said recognition of the spoken trigger word, a speech input of a context word associate with the at least one other application context; and
navigating from the user interface associated with the first application context to a user interface associated with the at least one other application context in response to said recognition of the speech input of the context word within the specific time interval.

2. A method as described in claim 1, wherein the user interface associated with the first application context comprises a different set of game functionality than does the user interface associated with the at least one other application context.

3. A method as described in claim 1, wherein the attributes of the game application comprise a version of the game application.

4. A method as described in claim 1, wherein the one or more attributes of the device further comprise a network connectivity status of the device.

5. A method as described in claim 1, wherein the attributes of the user comprise one or more of an account membership level for the application associated with the user, access permissions associated with the user, or an age of the user.

6. A method as described in claim 1, wherein said navigating occurs in response to said recognition and independent of additional input from a user.

7. A computer-implemented method comprising:
filtering a set of context options for a game application based on attributes of a device on which a game application is executable and attributes of a user of the device, the attributes of the device including a bandwidth of an existing network connection and a threshold processing capability for the device, the attributes of the device and the attributes of the user representing a set of context-specific criteria used to determine different application contexts for the game application;
generating a set of available context options for the game application based on said filtering, the set of available context options comprising a subset of the set of context options; and
enabling one or more available context options of the set of available context options to be selectable; and
navigating from a user interface associated with a first context of the game application to a user interface associated with a second context of the game application in response to a user selection via a speech command of an available context option from set of available context options, the first context being different from the second context.

8. A method as described in claim 7, wherein said filtering occurs in response to a speech recognition of a trigger word associated with the game application.

9. A method as described in claim 7, wherein said enabling comprises causing a context menu to be displayed that includes the one or more available context options of the set of available context options.

10. A method as described in claim 9, wherein said causing comprises causing the context menu to be displayed as part of the user interface associated with the first context.

11. A method as described in claim 7, wherein said enabling comprises enabling the one or more available context options to be selectable independent of the one or more available context options being displayed.

12. A method as described in claim 7, wherein the user interface associated with the first context is associated with a different set of game functionality than is the user interface associated with the second context.

13. A system comprising:
one or more processors; and
one or more computer-readable storage media storing a game application that is executable by the one or more processors to cause the system to perform operations including:
receiving an indication of a speech input of a trigger word while a user interface associated with a first game context of the game application is displayed on a computing device;
filtering a set of game contexts using one or more filtering criteria for the game application to generate a set of one or more available game contexts, the filtering criteria including one or more attributes of the computing device including a threshold processing capability of the computing device and a bandwidth of a network connection for the computing device;
causing cause the set of one or more available game contexts to be displayed as a part of the user interface associated with the first game context; and
navigating to a user interface associated with a second game context of the game application in response to an indication of a speech selection of one or more of the available game contexts within a specified time interval after the speech input of the trigger word.

14. A system as described in claim 13, wherein one of the first game context or the second game context is associated with game customization functionality, and wherein the other of the first game context or the second game context is associated with game play functionality.

15. A system as described in claim 13, wherein the filtering criteria further include one or more attributes of a user of the computing device.

16. A system as described in claim 13, wherein the filtering criteria further include a bandwidth of an active network connection of the computing device.

17. A system as described in claim 13, wherein the filtering criteria further include one or more of an account membership level for a user of the computing device, access permissions associated with the user, or an age of the user.

18. A method as described in claim 7, wherein the attributes of the user of the computing device comprise one or more of an account membership level for the user, an access permission associated with the user, or an age of the user.

19. A method as described in claim 7, wherein one of the first context or the second context is associated with game customization functionality, and wherein the other of the first context or the second context is associated with game play functionality.

20. A system as described in claim 13, wherein said filtering is further based on one or more attributes of a user of the computing device.

* * * * *